(12) United States Patent
Kaneko et al.

(10) Patent No.: US 9,738,993 B2
(45) Date of Patent: Aug. 22, 2017

(54) PRODUCTION METHOD FOR CARBON NANOFIBERS, AND CARBON NANOFIBERS

(71) Applicant: Denka Company Limited, Chuo-ku, Tokyo (JP)

(72) Inventors: Hitoshi Kaneko, Machida (JP); Toru Arai, Machida (JP); Masaya Umeyama, Machida (JP); Yoko Tamura, Machida (JP); Ayumu Tsukamoto, Machida (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 0 days.

(21) Appl. No.: 15/116,776

(22) PCT Filed: Feb. 3, 2015

(86) PCT No.: PCT/JP2015/052954
§ 371 (c)(1),
(2) Date: Aug. 4, 2016

(87) PCT Pub. No.: WO2015/119102
PCT Pub. Date: Aug. 13, 2015

(65) Prior Publication Data
US 2016/0348282 A1 Dec. 1, 2016

(30) Foreign Application Priority Data
Feb. 5, 2014 (JP) .................... 2014-020752

(51) Int. Cl.

| | | |
|---|---|---|
| *D01F 9/127* | (2006.01) | |
| *H01B 1/04* | (2006.01) | |
| *B01J 35/00* | (2006.01) | |
| *B01J 35/10* | (2006.01) | |
| *B01J 21/10* | (2006.01) | |
| *B01J 23/75* | (2006.01) | |
| B82Y 30/00 | (2011.01) | |
| B82Y 40/00 | (2011.01) | |

(52) U.S. Cl.
CPC ............ *D01F 9/1278* (2013.01); *B01J 21/10* (2013.01); *B01J 23/75* (2013.01); *B01J 35/0006* (2013.01); *B01J 35/1009* (2013.01); *H01B 1/04* (2013.01); *B82Y 30/00* (2013.01); *B82Y 40/00* (2013.01); *Y10S 977/762* (2013.01); *Y10S 977/896* (2013.01); *Y10S 977/932* (2013.01)

(58) Field of Classification Search
CPC ........ B01J 21/10; B01J 35/1009; B01J 23/75; B01J 35/0006; D01F 9/1278; D01F 9/10; D01F 9/127; D01F 9/1271; D01F 9/1272; D01F 9/1273; D01F 9/1274; D01F 9/1275; D01F 9/1276; D01F 9/1277; H01B 1/04; B82Y 40/00; B82Y 30/00; B82Y 5/00; B82Y 10/00; B82Y 15/00; B82Y 20/00; B82Y 25/00; B82Y 35/00; B82Y 99/00; Y10S 977/932; Y10S 977/896; Y10S 977/762; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/26; C01B 2202/28; C01B 2202/30; C01B 2202/32; C01B 2202/34; C01B 2202/36
USPC ........ 423/447.1–447.3, 445 B; 977/742–754, 977/842–848
See application file for complete search history.

(56) References Cited

U.S. PATENT DOCUMENTS

| | | | |
|---|---|---|---|
| 2011/0003151 | A1 | 1/2011 | Nishio |
| 2012/0156124 | A1* | 6/2012 | Goyal ................ C01B 31/0233 423/447.3 |
| 2014/0329093 | A1 | 11/2014 | Nishio |

FOREIGN PATENT DOCUMENTS

| | | |
|---|---|---|
| JP | 2004-299986 A | 10/2004 |
| JP | 2004-300631 A | 10/2004 |
| JP | 2006-152490 A | 6/2006 |
| JP | 2013-075781 A | 4/2013 |
| JP | 2013-230951 A | 11/2013 |

(Continued)

OTHER PUBLICATIONS

International Search Report mailed May 12, 2015, issued in corresponding International Application No. PCT/JP2015/052954, filed Feb. 3, 2015, 5 pages.

*Primary Examiner* — Daniel C McCracken
(74) *Attorney, Agent, or Firm* — Christensen O'Connor Johnson Kindness PLLC

(57) ABSTRACT

A manufacturing method of carbon nanofibers at a high activity is provided. Further, carbon nanofibers produced by the manufacturing method and being excellent in electric conductivity, crystallinity and dispersibility is provided.

By a manufacturing method of carbon nanofibers in which an active species including cobalt as a chief component is employed as a catalyst and carbon monoxide is used as a carbon source, wherein said catalyst has 3 to 150 mass % of said active species carried on a carrier composed of a magnesium-containing oxide having a specific surface area of 0.01 to 5 m$^2$/g, and a reaction temperature, partial pressure of carbon monoxide and a flow rate of raw material gas is controlled, CNFs that are excellent in electric conductivity, crystallinity and dispersibility can be manufactured at high activity, so that carbon nanofibers that is excellent in electric conductivity, crystallinity and dispersibility is obtained.

6 Claims, 3 Drawing Sheets

(56) References Cited

FOREIGN PATENT DOCUMENTS

WO 2009/110570 A1 9/2009
WO 2012/053334 A1 4/2012

\* cited by examiner

PRODUCTION METHOD FOR CARBON NANOFIBERS, AND CARBON NANOFIBERS

TECHNICAL FIELD

The present invention is related to a manufacturing method of carbon nanofibers employing a catalyst in which a predetermined amount of an active species including cobalt as a chief component is carried on a carrier composed of a magnesium-containing oxide having a predetermined specific surface area and carbon monoxide is used as a carbon source, and to carbon nanofibers manufactured by the method.

BACKGROUND

As a filler for providing electric conductivity to a resin or as an electric conductivity-providing material in an electrode of various kind of batteries, especially lithium-ion battery, acetylene black and carbon nanofibers (hereafter, referred to as CNFs), which are electrically conductive carbon materials, as well as a mixture thereof are used. In particular, using or adding CNFs leads to a preferable result that a high electric conductivity is achieved with a relatively low content of the electrically conductive carbon material, and thus, hopes are concentrated thereon. Here, a CNF generally has a fibrous form having an external diameter of 5 to 100 nm and an aspect ratio, which is a ratio of fiber length to external diameter, of 10 or more.

Conventionally, in manufacturing CNFs, an electrode discharging method, a catalytic vapor-phase growth method, a laser method and the like are employed, among which the catalytic vapor-phase growth method is recognized as most suitable for an industrial manufacturing method. According to the catalytic vapor-phase growth method, transition metal particles are used as a catalyst, which are brought into contact with a raw material gas of a carbon source such as acetylene and benzene at an elevated temperature of generally 900° C. or more, to grow CNFs from the catalyst particles. Particularly, a method to manufacture CNFs, using as a catalyst a transition metal component such as cobalt, from gas containing chiefly carbon monoxide as a raw material attracts attention as a method to produce CNFs of high purity and high quality at a relatively low temperature (Patent Documents 1 to 5).

PRIOR ART DOCUMENTS

Patent Documents

Patent Document 1: Japanese Unexamined Patent Application Publication No. 2004-299986
Patent Document 2: Japanese Unexamined Patent Application Publication No. 2004-300631
Patent Document 3: Japanese Unexamined Patent Application Publication No. 2006-152490
Patent Document 4: Re-publication of PCT International Publication No. WO2009/110570
Patent Document 5: Re-publication of PCT International Publication No. WO2012/053334

SUMMARY

Problems to be Solved by the Invention

However, conventional techniques disclosed in the above documents have room for improvement in the following points.

In the technique of any document, yield and activity of CNFs are not sufficient and higher activity is required as a catalyst. Further, in a case where obtained CNFs are used as an electrically conductive material or an electric conductivity aid, CNFs having higher electric conductivity (lower volume resistivity) are required.

Moreover, in a case where CNFs are used as a filler for providing electric conductivity to a matrix such as resin or in a case where CNSs are used as an electric conductivity-providing agent in a lithium-ion battery, dispersibility of CNFs is important, however, the fine carbon fibers of conventional CNFs or the like get highly entangled forming a secondary structure and thus are poor in dispersibility.

In view of the above-mentioned problems and the actual circumstances, an object of the present invention is to provide a manufacturing method by which CNFs that are excellent in crystallinity, electric conductivity and dispersibility are produced at high activity. Further, providing CNFs having excellent crystallinity, electric conductivity and dispersibility is another object.

Means to Solve the Problem

According to the present invention, a manufacturing method of carbon nanofibers described below is provided.

(1) A manufacturing method of carbon nanofibers, wherein an active species including cobalt as a chief component is employed as a catalyst and carbon monoxide is used as a carbon source, and manufacturing is performed under the conditions that said catalyst has 3 to 150 mass % of said active species carried on a carrier composed of a magnesium-containing oxide having a specific surface area of 0.01 to 5 $m^2/g$, a reaction temperature is between 670 and 780° C., partial pressure of carbon monoxide is between 0.04 and 0.98 MPa, and a flow rate of carbon monoxide gas is 2 NL/g of active species·min or more.

(2) A manufacturing method of item (1) wherein, preferably, a carrying rate of said catalyst is between 3 and 90 mass %, and partial pressure of hydrogen is between 1 to 100% relative to the partial pressure of carbon monoxide.

According to the present invention, carbon nanofibers described below is provided.

(3) Carbon nanofibers produced by a manufacturing method of item (1) or (2), wherein volume resistivity measured under a load of 9.8 MPa is 0.030 Ω·cm or less and D/G is between 0.5 and 1.3, and dispersed particles of 1 μm or less in toluene is 40 volume % or more or a median diameter D50 is 5 μm or less.

(4) Carbon nanofibers produced by a manufacturing method of item (2), wherein volume resistivity measured under a load of 9.8 MPa is 0.030 Ω·cm or less and D/G is between 0.5 and 1.3, and dispersed particles of 1 μm or less in toluene is 70 volume % or more or a median diameter D50 is 0.7 μm or less.

(5) Carbon nanofibers wherein volume resistivity measured under a load of 9.8 MPa is 0.030 Ω·m or less and D/G is between 0.5 and 1.3, and dispersed particles of 1 μm or less in toluene is 40 volume % or more or a median diameter D50 is 5 μm or less.

(6) Carbon nanofibers of item 5 wherein, preferably, said dispersed particles of 1 μm or less in toluene is 70 volume % or more or said median diameter D50 is 0.7 μm or less.

Advantageous Effect of the Invention

According to the present invention, in manufacturing CNFs with carbon monoxide being used as a carbon source, by using a catalyst having, as an active species, metal including cobalt as a chief component, which catalyst is carried on a carrier composed of a magnesium-containing oxide having a specific surface area of 0.01 to 5 m²/g, CNFs can be manufactured at higher activity, and a manufacturing method can be provided for CNFs that have high crystallinity, excellent electric conductivity, and, in addition, high dispersibility. Further, according to the present invention, CNFs can be provided that have high crystallinity, excellent electric conductivity, and, in addition, high dispersibility.

DETAILED DESCRIPTION OF PREFERRED EMBODIMENTS

<Explanation of Terms>
Definition of CNFs in the present description is a concept of CNFs having an average external diameter of 5 to 100 nm and an aspect ratio showing a ratio of fiber length to external diameter of 10 or more, and encompassing also multi-walled carbon nanotubes (MWCNTs). CNFs in the present embodiment are not particularly limited but preferably have multi-walled carbon nanotubes as a chief component, and are more preferably multi-walled carbon nanotubes.

Figure 1:
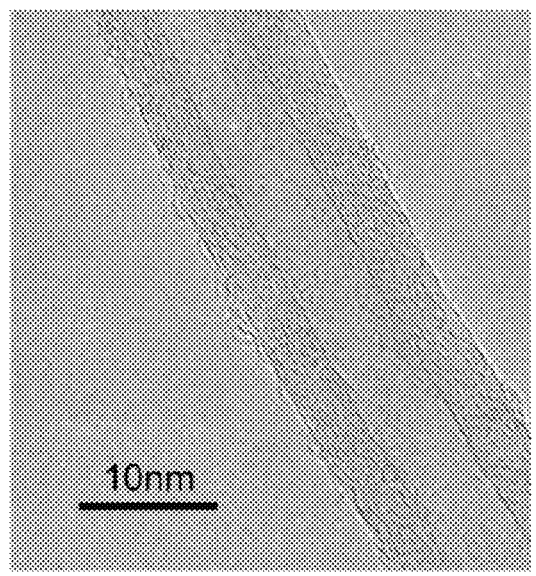
FIG. 1 is a TEM photograph of a CNF synthesized in Example 10.
Figure 2:
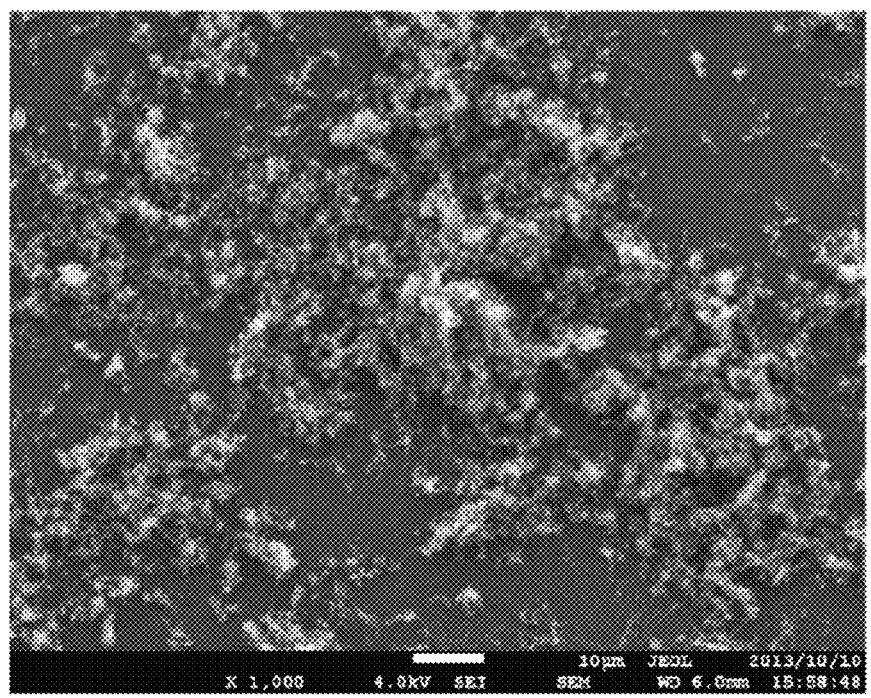
FIG. 2 is a SEM photograph of CNFs synthesized in Example 3.
Figure 3:
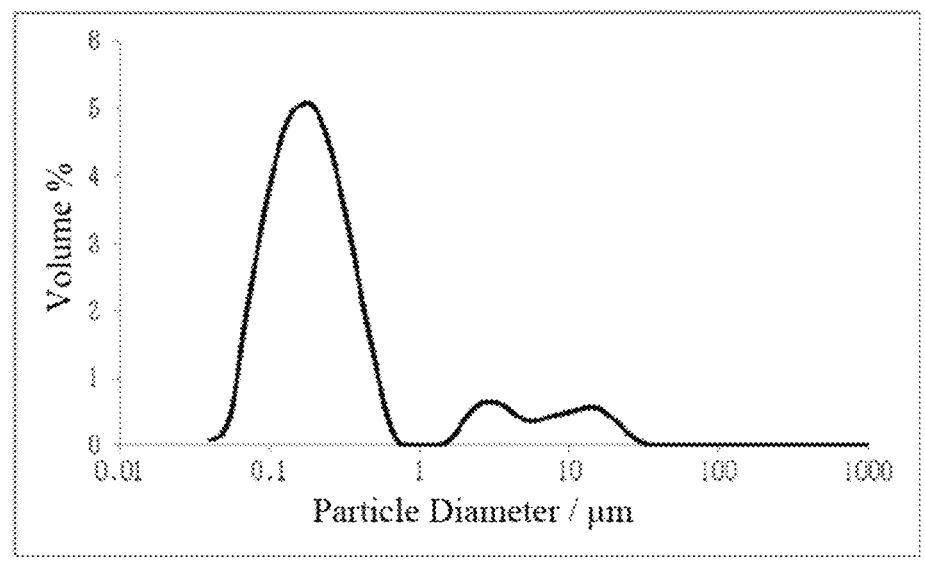
FIG. 3 is a diagram showing a particle size distribution of CNFs synthesized in Example 3.
Figure 4:
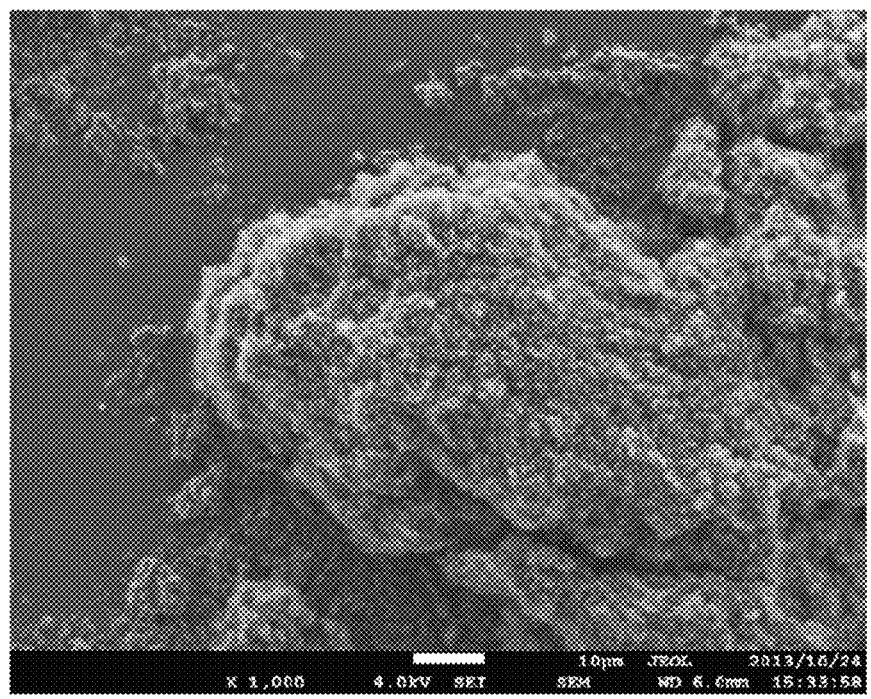
FIG. 4 is a SEM photograph of CNFs synthesized in Comparative Example 7.
Figure 5:
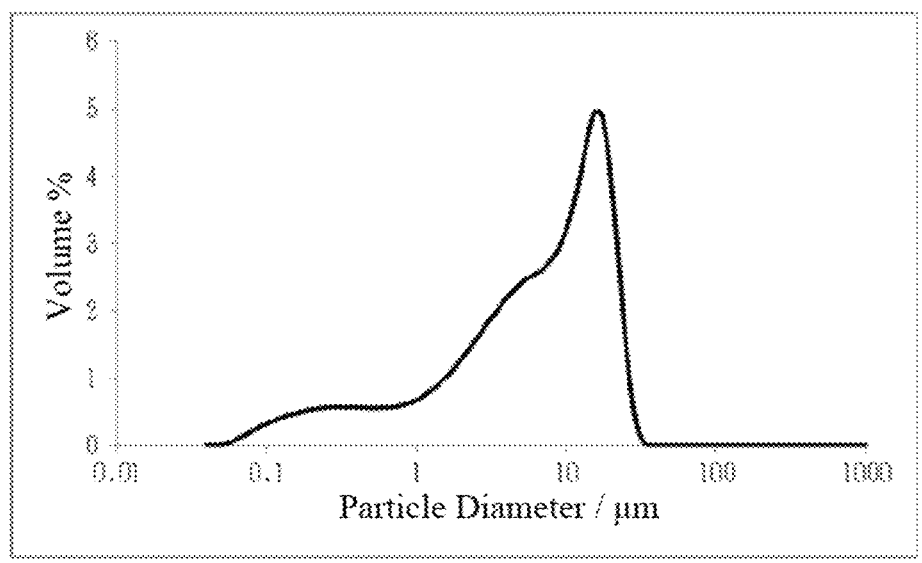
FIG. 5 is a diagram showing a particle size distribution of CNFs synthesized in Comparative Example 7.

Note that single-walled carbon nanotubes (SWCNTs) are not included in the definition of CNFs of the present description. Although single-walled carbon nanotubes have a characteristic property of showing high electric conductivity, they are accompanied by practical problems such that isomers exist due to chirality and they have bundle structures, and thus, they are not in conformity with the object of the present application. Note that a TEM photograph of a CNF synthesized in Example 10 is shown in FIG. 1 as an example of a CNF of the present embodiment. From FIG. 1, it is known that a CNF synthesized in Example 10 is a multi-walled carbon nanotube.

Synthetic activity in the present description means mass of CNF obtained per unit mass of active species per unit time. Further, catalytic activity in the present description means mass of CNF obtained per unit mass of catalyst per unit time. The active species noted here is metal including cobalt as a chief component.

Further, a carrier is an oxide for carrying said active species.

In the present description, the phrase of "between A and B" and "A to B" means a range including the values of both ends. For example, "between A and B" should be understood as "greater than or equal to A and smaller than or equal to B".

Hereafter embodiments of the present invention will be described in detail.

A manufacturing method of carbon nanofibers in the present embodiment is a method for manufacturing CNFs in which an active species including cobalt as a chief component is employed as a catalyst, and carbon monoxide is used as a carbon source, and manufacturing is performed under the conditions that said catalyst comprises 3 to 150 mass % of said active species carried on a carrier composed of a magnesium-containing oxide having a specific surface area of 0.01 to 5 m²/g, a reaction temperature is 670 to 780° C., partial pressure of carbon monoxide is between 0.04 and 0.98 MPa, and a flow rate of carbon monoxide is 2 NL/g of active species·min or more.

<Catalyst>
The manufacturing method of carbon nanofibers in the present embodiment employs a catalyst in which an active species including cobalt as a chief component is carried on a magnesium-containing oxide. Cobalt can be included not only as metal cobalt but also in the form of a compound such as oxide, hydroxide, hydrous oxide, nitrate, acetate, oxalate and carbonate.

In the active species, an element of groups 4 to 12 may be included as a component other than cobalt. Examples of these elements include iron group such as iron and nickel as well as manganese and molybdenum. However, thought not particularly limited, at least 60 mole %, preferably 80 mole % or more, most preferably 90 mole % or more is the cobalt component in the components of group 4 to 12 elements included as the active species of the catalyst. As the components of the active species other than the group 4 to 12 elements, a component of groups 1 to 3 or group 14 may be included. Hereafter, an active species having cobalt as the chief component is referred simply to as a cobalt active species.

<Carrier>
As the carrier on which the active species are carried is used a magnesium-containing oxide having a specific surface area of 0.01 to 5 m²/g. Magnesium-containing oxide includes, for example, magnesium oxide, a spinel-type oxide and a perovskite-type oxide that contain magnesium oxide, or the like. Among these compounds, magnesium oxide is the most preferable as the carrier.

A specific surface area of the magnesium-containing oxide is preferably 0.01 to 4 m²/g and more preferably 0.01 to 3 m²/g. If the specific surface area is less than 0.01 m²/g, crystallinity and electric conductivity of CNFs obtained are sometimes decreased. If the specific surface area is greater than 5 m²/g, dispersibility of CNFs obtained is sometimes decreased. An oxide of metal other than magnesium selected from groups 1 to 3 and group 14 may be contained in the carrier. Taking the carrier as 100 mass %, a content of magnesium-containing oxide in the carrier is preferably at least 50 mass %, more preferably 90 mass % or more, and most preferably 98 mass % or more. When the content of magnesium-containing oxide is 50 mass % or more, decrease of synthetic activity can be suppressed more.

Carrying rate of the cobalt active species on the carrier is 3 to 150 mass % and preferably 3 to 90 mass %. If the carrying rate is less than 3 mass %, crystallinity of CNFs obtained is sometimes decreased causing electric conductivity to be low. If the carrying rate is more than 150 mass %, particle size of cobalt particles is sometimes increased lowering synthetic activity significantly. With the carrying rate being 90 mass % or less, CNFs having very high dispersibility can be manufactured at higher activity.

Note that carrying rate is calculated based on the following equation.

Carrying Rate=Mass of Cobalt Active Species/Mass of Carrier×100(%)

When cobalt active species is carried on the carrier, the method of carrying is not particularly limited. For example, it is possible to immerse a carrier in a non-aqueous solution (e.g., ethanol solution) or an aqueous solution in which a salt of cobalt has been dissolved and dispersion mixing is performed thoroughly, and then the carrier is dried and heated in air at a high temperature (300 to 600° C.) to make a cobalt active species carried on the carrier. Further, it may also be sufficient that a carrier is immersed in a non-aqueous solution (e.g., ethanol solution) or an aqueous solution in which a salt of cobalt has been dissolved, dispersion mixing is performed thoroughly, and then water is simply removed to dry the carrier.

<Method and Conditions for Manufacturing CNFs>

Carbon Source

The manufacturing method of CNFs in the present embodiment is a method for manufacturing carbon nanofibers in which carbon monoxide is used as a carbon source. Here, carbon monoxide used as a raw material for a carbon source may be mixed gas with carbon dioxide and may contain inert gas such as nitrogen. Note that in a case where carbon monoxide gas used as the raw material is mixed gas with carbon dioxide, though not particularly limited, at least 80 mole %, preferably 90 mole % or more, and most preferably 100 mole % component is carbon monoxide.

Raw Material Gas

In the manufacturing method of CNFs of the present embodiment, it is preferable to use carbon monoxide in the presence of hydrogen. That is, in the manufacturing method of CNFs of the present embodiment, the raw material gas contains carbon monoxide, and the raw material gas preferably contains hydrogen as well as carbon monoxide. Further, the raw material gas may contain inert gas such as nitrogen, and it may contain other substances. Partial pressure of carbon monoxide is 0.04 to 0.98 MPa. Partial pressure of carbon monoxide is preferably 0.05 to 0.3 MPa and more preferably 0.05 to 0.11 MPa.

If partial pressure of carbon monoxide is less than 0.04 MPa, synthetic activity is sometimes decreased or crystallinity and electric conductivity of obtained CNFs are sometimes decreased. Further, if partial pressure of carbon monoxide is more than 0.98 MPa, dispersibility of obtained CNFs is sometimes decreased or deactivation of catalyst sometimes becomes remarkable and thus synthetic activity is decreased.

Note that when the raw material gas contains only carbon monoxide, partial pressure of carbon monoxide noted above represents total pressure of the raw material gas.

Partial pressure of hydrogen is preferably 1 to 100% relative to partial pressure of carbon monoxide, and more preferably 10 to 100%. If partial pressure of hydrogen relative to partial pressure of carbon monoxide is more than 100%, synthetic activity is sometimes decreased or crystallinity and electric conductivity of obtained CNFs are sometimes decreased. In the case that partial pressure of hydrogen is 1% or less, deactivation of catalyst sometimes occurs promptly, resulting in lowered synthetic activity. Also, dispersibility of CNFs is sometimes lowered.

Note that partial pressure of hydrogen relative to partial pressure of carbon monoxide can be calculated based on the following equation.

Partial Pressure of Hydrogen Relative to Partial Pressure of Carbon Monoxide=Molar Ratio of Hydrogen/Molar Ratio of Carbon Monoxide× 100(%)

For example, in the case, as shown in Table 1, that the raw material composition is $CO/H_2/N_2=85/15/0$, partial pressure of hydrogen relative to partial pressure of carbon monoxide is calculated as follows:

Partial Pressure of Hydrogen Relative to Partial Pressure of Carbon Monoxide=15/85×100=18 (%).

In the manufacturing method of CNFs of the present embodiment, total gas pressure of the raw material gas is arbitrary but preferably 0.98 MPa or less. If total gas pressure is more than 0.98 MPa, it is probable that costs for facilities against high pressure and utilities become large in manufacturing. Further, if total gas pressure is significantly lower than 0.1 MPa (atmospheric pressure), for example, less than 0.08 MPa, it is sometimes difficult to seal reactors of high temperature against entrance of atmosphere (oxygen).

Further in the manufacturing method of CNFs of the present embodiment, a flow rate of carbon monoxide gas is 2 NL/g of active species·min or more. By setting the flow rate of carbon monoxide gas within this range, CNFs can be manufactured at high synthetic activity. Here, high synthetic activity specifically means 10 g of CNF/g of active species·h (time) or more. Though no upper limit is specified for the flow rate of carbon monoxide gas, if it is more than 200 NL/g of active species·min, the amount of flow is so large that utility costs for residual heat become large, which is undesirable. Further, synthetic activity is sometimes decreased.

Note that "NL" represents an amount L (liter) of gas reduced into normal conditions (0° C., 1 atm), and "NL/g of active species·min" represents an amount of gas flow in 1 minute in the presence of a unit of active species (per 1 g of active species).

In the manufacturing method of CNFs of the present embodiment, a reaction temperature is between 670 and 780° C., more preferably between 700 and 750° C. If the reaction temperature is lower than 670° C., crystallinity, electric conductivity and dispersibility of CNFs are sometimes decreased. Further, if the reaction temperature is higher than 780° C., synthetic activity is sometimes decreased.

In the manufacturing method of CNFs of the present embodiment, known manufacturing methods and known manufacturing apparatuses can be used. For example, a fixed-bed reactor or a fluidized-bed reactor and a batch-type or batch-wise reactor or a continuous reactor can be used.

It is preferable that the active species and the carrier are removed from the CNFs manufactured by the manufacturing method of CNFs of the present embodiment in order to increase purity. Removal of the active species and the carrier can be performed by the method described in Japanese Unexamined Patent Application Publication No. 2006-69850 or the like, where CNFs are dispersed in acid such as hydrochloric acid, nitric acid and sulfuric acid, and subsequently recovered by means of filtration, centrifugation and the like.

<CNF>

By manufacturing CNFs in the presence of the catalyst and under the manufacturing conditions of the present embodiment, CNFs of high crystallinity can be obtained. Specifically, CNFs can be obtained whose D/G value obtained through Raman spectrometry measurement of CNFs is 0.5 or more and 1.3 or less. Here, the D/G value can be obtained from a ratio of a total area derived from a D-band peak to a total area derived from a G-band peak in Raman spectrometry measurement of CNF powder. The smaller the D/G value is, the higher crystallinity of CNFs is, and thus, the higher electric conductivity of CNFs is.

By manufacturing CNFs in the presence of the catalyst and under the manufacturing conditions of the present embodiment, CNFs of high electric conductivity, in other words, low volume resistivity, can be obtained. Specifically, CNFs having volume resistivity of 0.030 Ω·cm or less can be obtained. That is, CNFs obtained by the manufacturing method of the present embodiment have a characteristic that a D/G value obtained through Raman spectrometry measurement is 0.5 or more and 1.3 or less and volume resistivity is 0.030 Ω·cm or less.

By manufacturing CNFs in the presence of the catalyst and under the manufacturing conditions of the present embodiment, CNFs with good dispersibility can be obtained for which an existence ratio of dispersed particles of 1 μm or less in toluene, without any dispersing process, is 40 volume % or more. Further, in the CNFs of the present embodiment, electric conductivity network is increased due to improvement of dispersibility, so that when used as an electric conductivity-providing material such as an electrically conductive filler, the CNFs are able to improve electric conductivity. Further, it is preferable that a median diameter (D50) in particle size distribution of the CNFs of the present embodiment is 5.0 μm or less.

Here, a dispersing process means a dispersing or pulverizing process performed mechanically, for example, by a mechanical homogenizer, ball mill or emulsifying disperser. Further, high-power ultrasonic irradiation by an ultrasonic homogenizer, an ultrasonic disperser or the like also falls in this category.

However, in the present description, a suspending or homogenizing process applied to a liquid to be measured for 10 minutes or less by a commercially available bath-type ultrasonic washing apparatus whose ultrasonic output is 100 W or less does not fall in the category of the dispersing process mentioned above. That is, in examples of the present application, irradiation of ultrasonic wave is performed for 5 minutes using a commercially available bath-type ultrasonic washing apparatus as pretreatment for measurement of dispersibility by a light scattering method, however, this process is not included in the dispersing process mentioned above.

Further, in the present description, a suspending or homogenizing process performed by a magnetic stirrer in such a degree that a rotation rate is 500 rpm or less and duration is 60 minutes or less does not fall in the category of the dispersing process mentioned above. That is, in examples of the present application, a suspending or homogenizing process is performed by a magnetic stirrer at a rotation rate of 300 rpm for 30 minutes as a removing process of magnesium oxide and an active species in CNFs synthesized at catalytic activity less than 3 g of CNF/g of catalyst·h, however, this process is not included in the dispersing process mentioned above.

Further, an ultrasonic process performed by an accessary apparatus of a measuring apparatus, for example, at 100 W for 5 minutes in measurement concerning to dispersibility, i.e., measurement of a ratio and a median diameter of dispersed particles of 1 μm or less in the present description, that is, a homogenizing and pre-dispersing process necessary for the measurement (hereafter, pre-measurement process) is not included in the dispersing process mentioned above. CNFs of the present embodiment, even when the same pre-measurement process is applied, have higher dispersibility compared to conventional CNFs and can satisfy the criterion on dispersibility of the present application.

Further, the present inventors studied intensively in view of higher dispersibility of CNFs to find that, in the manufacturing method of CNF of the present embodiment, when a synthesis condition is satisfied that a carrying rate of cobalt active species on a carrier is preferable 3 to 90 mass % and partial pressure of hydrogen gas is within a range of 1 to 100% relative to partial pressure of carbon monoxide gas, CNFs having excellent dispersibility can be obtained for which an existence ratio of dispersed particles of 1 μm or less in toluene is 70 volume % or more in a state where no dispersing process is applied. Further, in this case, a median diameter (D50) in particle size distribution of CNFs obtained is 0.7 μm or less.

<CNFs of the Embodiment in Another View of the Present Invention>

In another view of the present invention, the CNFs of the present embodiment has characteristics that a D/G value obtained through Raman spectrometry measurement is 0.5 or more and 1.3 or less, volume resistivity is 0.030 Ω·cm or less, and in a state where no dispersing process is performed, an existence ratio of dispersed particles of 1 μm or less in particle size distribution obtained in toluene is 40 volume % or more, and a median diameter (D50) in particle size distribution of CNFs is 5.0 μm or less. Further, the existence ratio of dispersed particles of 1 μm or less in particle size distribution obtained in toluene is preferably 70 volume % or more. Further, the median diameter (D50) in particle size distribution of CNFs is preferably 0.7 μm or less. Further, specific surface area of CNFs is, though not particularly limited, preferably 50 to 300 $m^2/g$ and more preferably 70 to 200 $m^2/g$.

If a D/G value obtained through Raman spectrometry measurement is less than 0.5, it is difficult to manufacture CNFs at high activity, and if the value is more than 1.3, crystallinity of CNFs is poor.

If a median diameter (D50) in particle size distribution of CNFs is more than 5.0 μm, dispersibility of CNFs can be said to be poor.

EXAMPLES

Hereafter, the present invention will be described based on examples, however, the invention is not limited to these examples.

<Cobalt-magnesium Oxide Carried Catalyst>

Example 1 of Catalyst Preparation 0.62 g of cobalt nitrate hexahydrate (3N5, product of Kanto Chemical Co., Inc.) was weighed out and dissolved in 30 g of a mixed solvent of distilled water and ethanol at a mass ratio of 2:1. To the aqueous solution of cobalt nitrate 2.5 g of magnesium oxide (DENMAG (registered trade mark) KMAOH-F, product of Tateho Chemical Industries) with specific surface area of 0.61 $m^2/g$ was added and stirred for 1 hour in a state of being kept at 50° C. in a water bath. After stirring water was evaporated by an evaporator. A solid material obtained was dried at 60° C. for 24 hours, and subsequently a sintering process was performed at 400° C. for 5 hours. After the sintering process the solid material obtained was pulverized in an agate mortar and a cobalt-magnesium oxide carried catalyst carrying 5 mass % of cobalt metal was obtained.

Example 2 of Catalyst Preparation

By a procedure similar to Example 1 of Catalyst Preparation except that the amount of cobalt nitrate hexahydrate was changed to 2.47 g, a cobalt-magnesium oxide carried catalyst with a cobalt carrying rate of 20 mass % was prepared.

Example 3 of Catalyst Preparation

By a procedure similar to Example 1 of Catalyst Preparation except that the amount of cobalt nitrate hexahydrate was changed to 6.17 g, a cobalt-magnesium oxide carried catalyst with a cobalt carrying rate of 50 mass % was prepared.

Example 4 of Catalyst Preparation

By a procedure similar to Example 1 of Catalyst Preparation except that the amount of cobalt nitrate hexahydrate was changed to 4.74 g, that the solvent was changed to 15 g of a mixed solvent of distilled water and ethanol at a mass ratio of 2:1 and that the amount of magnesium oxide was changed to 1.2 g, a cobalt-magnesium oxide carried catalyst with a cobalt carrying rate of 80 mass % was prepared.

Example 5 of Catalyst Preparation

By a procedure similar to Example 1 of Catalyst Preparation except that the amount of cobalt nitrate hexahydrate was changed to 12.35 g, a cobalt-magnesium oxide carried catalyst with a cobalt carrying rate of 100 mass % was prepared.

Example 6 of Catalyst Preparation

By a procedure similar to Example 1 of Catalyst Preparation except that the amount of cobalt nitrate hexahydrate was changed to 18.52 g, a cobalt-magnesium oxide carried catalyst with a cobalt carrying rate of 150 mass % was prepared.

Example 7 of Catalyst Preparation

By a procedure similar to Example 1 of Catalyst Preparation except that the amount of cobalt nitrate hexahydrate was changed to 2.47 g and that magnesium oxide was changed to 2.5 g of one (DENMAG (registered trade mark) KMAOH-H, product of Tateho Chemical Industries) with specific surface area of 0.05 $m^2/g$, a cobalt-magnesium oxide carried catalyst with a cobalt carrying rate of 20 mass % was prepared.

Example 8 of Catalyst Preparation

By a procedure similar to Example 1 of Catalyst Preparation except that the amount of cobalt nitrate hexahydrate was changed to 2.47 g and that magnesium oxide was changed to 2.5 g of one (DENMAG (registered trade mark) SSP#3, product of Tateho Chemical Industries) with specific surface area of 0.11 $m^2/g$, a cobalt-magnesium oxide carried catalyst with a cobalt carrying rate of 20 mass % was prepared.

Example 9 of Catalyst Preparation

By a procedure similar to Example 1 of Catalyst Preparation except that the amount of cobalt nitrate hexahydrate was changed to 2.47 g, that magnesium oxide was changed to 2.5 g of magnesium oxide (SMO-5, product of Sakai Chemical Industry Co., Ltd) with specific surface area of 0.39 $m^2/g$ and that the solvent was changed to 30 g of a mixed solvent of distilled water and ethanol at a mass ratio of 5:1, a cobalt-magnesium oxide carried catalyst with a cobalt carrying rate of 20 mass % was prepared.

Example 10 of Catalyst Preparation

By a procedure similar to Example 1 of Catalyst Preparation except that the amount of cobalt nitrate hexahydrate was changed to 2.47 g and that magnesium oxide was changed to 2.5 g of one (SMO-1, product of Sakai Chemical Industry Co., Ltd) with specific surface area of 2.03 $m^2/g$, a cobalt-magnesium oxide carried catalyst with a cobalt carrying rate of 20 mass % was prepared.

Example 11 of Catalyst Preparation

By a procedure similar to Example 1 of Catalyst Preparation except that the amount of cobalt nitrate hexahydrate was changed to 6.17 g and that magnesium oxide was changed to 2.5 g of one (SMO-0.1, product of Sakai Chemical Industry Co., Ltd) with specific surface area of 9.38 $m^2/g$, a cobalt-magnesium oxide carried catalyst with a cobalt carrying rate of 50 mass % was prepared.

<Cobalt-zinc Oxide Carried Catalyst>

Example 12 of Catalyst Preparation

By a procedure similar to Example 1 of Catalyst Preparation except that the amount of cobalt nitrate hexahydrate was changed to 6.17 g, that magnesium oxide was changed to 2.5 g of zinc oxide (LPZINC-5, product of Sakai Chemical Industry Co., Ltd) with specific surface area of 0.24 $m^2/g$ and that the solvent was changed to 30 g of distilled water, a cobalt-zinc oxide carried catalyst with a cobalt carrying rate of 50 mass % was prepared.

<Cobalt-aluminum Oxide Carried Catalyst>

Example 13 of Catalyst Preparation

By a procedure similar to Example 1 of Catalyst Preparation except that the amount of cobalt nitrate hexahydrate was changed to 6.17 g, that magnesium oxide was changed to 2.5 g of aluminum oxide (Alumina DAW70, product of Denki Kagaku Kogyo Kabushiki Kaisha) with specific surface area of 0.18 $m^2/g$ and that the solvent was changed to 30 g of distilled water, a cobalt-aluminum oxide carried catalyst with a cobalt carrying rate of 50 mass % was prepared.

<Iron-magnesium Oxide Carried Catalyst>

Example 14 of Catalyst Preparation

By a procedure similar to Example 1 of Catalyst Preparation except that cobalt nitrate hexahydrate was changed to 9.0 g of iron nitrate nonahydrate (product of Kanto Chemical Co., Inc., special grade reagent), an iron-magnesium oxide carried catalyst with an iron carrying rate of 50 mass % was prepared.

<Cobalt-magnesium Oxide Coprecipitated Catalyst>

Example 15 of Catalyst Preparation

As a catalyst other than a carried catalyst, a coprecipitated catalyst composed of cobalt oxide and magnesium oxide was prepared in the following procedure. Pursuant to Japanese Patent No. 5003023, a catalyst was prepared in the following manner. To 25 mL of ion-exchanged water was added 5.75 g (0.02 mole) of cobalt nitrate [$Co(NO_3)_2 \cdot 6H_2O$, molecular weight 291.03] and 5.10 g (0.02 mole) of magnesium nitrate [$Mg(NO_3)_2 \cdot 6H_2O$, molecular weight 256.41] to prepare raw material solution (1). Further, to 55 mL of ion-exchanged water was added 11 g (0.139 mole) of powdered ammonium bicarbonate [$(NH_4)HCO_3$, molecular weight 79.06] to prepare raw material solution (2). Next, raw material solution (1) was mixed with raw material solution (2) at a reaction temperature of 40° C. and then stirred for 4 hours. Precipitates formed were filtered, washed and dried. Then the precipitates were sintered and pulverized in a mortar, and 2.48 g of catalyst was obtained.

<Cobalt Oxide-magnesium Oxide Mixture Catalyst>

Example 16 of Catalyst Preparation

A mixture catalyst was prepared by mixing in a mortar 5 mg of cobalt nanoparticles (cobalt nano powder APS 5-15 nm, product of Alfa Aesar) and 100 mg of magnesium oxide (SMO-5, product of Sakai Chemical Industry Co., Ltd, specific surface area 0.35 $m^2/g$).

<Removing Process of Carrier from Synthesized CNFs>

Synthesized CNFs contain magnesium oxide used as a carrier and an active species. Note that in a case where catalytic activity is less than 3 g of CNF/g of catalyst·h, amounts of magnesium oxide and an active species in CNFs obtained by synthesis are large and sometimes exert influence on electric conductivity and dispersibility. Therefore, a removing process of magnesium oxide and an active species was performed on CNFs having catalytic activity of less than 3 g of CNF/g of catalyst·h.

First, 300 mg of synthesized CNFs was placed in 150 mL of 1 mol/L hydrochloric acid, and a suspending or homogenizing process was performed using a magnetic stirrer at a rotation rate of 300 rpm for 30 minutes. Then toluene and the CNF-containing hydrochloric acid was placed in a separatory funnel to separate CNFs into toluene, and CNF-containing toluene was washed with distilled water three times.

After the removing process of magnesium oxide and an active species, volume resistivity, specific surface area and an existence ratio of particles having a particle diameter of 1 μm or less were measured on the obtained CNFs.

<Measurement of Specific Surface Area>

Specific surface area of CNF powder was measured by a BET one point method according to JIS K6217-2 using Macsorb HM model-1201 manufactured by Mountech Co., Ltd.

<Measurement of Volume Resistivity>

Volume resistivity of CNF powder was measured by a four-point probe method using Loresta GP manufactured by Mitsubishi Chemical Analytech Co., Ltd., under the conditions of 23° C., atmosphere of relative humidity 50%, and load of 9.8 MPa. Correcting measurement was performed using a material whose synthetic activity was 10 g of CNF/g of active species·h or more. 100 mg of CNFs was used in the measurement.

<Raman Spectrometry Measurement>

Raman spectrometry measurement of CNF powder was performed using a microscopic laser Raman spectroscopic analyzer (Niolet Almega-XR type, manufactured by Thermo Fisher Scientific Inc., laser 532 nm). After separating waveforms of D-band (D1: peak position 1330 $cm^{-1}$, D3: 1500 $cm^{-1}$, D4: 1150 $cm^{-1}$) and G-band (G+: 1600 $cm^{-1}$, G-: 1570 $cm^{-1}$), a ratio of a total of areas derived from D-band peaks to a total of areas derived from G-band peaks (D/G value) was obtained. The smaller the D/G value is, the higher the crystallinity of the CNFs is. Note that if a D/G value is smaller than 0.5, it is difficult to manufacture CNFs at high activity.

(Reference)
D1: deriving from point defects within graphite crystal structure and defects at end point of crystal
D3: deriving from amorphous carbon
D4: deriving from polyene and ionic impurity
G+: crystalline peak of graphite: longitudinal optical mode
G-: crystalline peak of graphite: transverse optical mode <Ratio and Median Diameter of Dispersed Particles of 1 μm or Less>

A toluene solution of 0.1 mass % of CNFs was prepared, and ultrasonication was performed for 5 minutes using a commercially available ultrasonic bath (US Cleaner US-2A, manufactured by AS ONE Corporation, ultrasonic output 80 W) to suspend or homogenize.

For measurement of a ratio and a median diameter of dispersed particles, a particle size analyzer (LS 13 320 universal liquid module, manufactured by Beckman Coulter, Inc.) was used. The optical model was set to the refractivity of toluene, filled with toluene, and offset measurement, optical axis alignment and background measurement were performed under the condition of a pump speed of 50%, and subsequently, a prepared toluene solution was added to the particle size analyzer such that a relative concentration, which is indicative of a percentage of light diffused out of the beam by the particles, is 8 to 12%, or PID is 40 to 55%, then, ultrasonic irradiation was performed at 100 W for 2 minutes by an accessory apparatus of the particle size analyzer (pre-measurement process), and circulation was performed for 30 minutes to remove air bubbles, and thereafter, measurement of particle size distribution was performed. A graph of volume % to particle size (particle diameter) was prepared, and an existence ratio and a median diameter D50 of particles of 1 μm or less were obtained.

Measurement was performed as follows: for one test specimen of CNFs, three samples for measurement were collected from different locations, and three measurements of particle size distribution mentioned above were performed for each sample, then, an average value was calculated of seven values, excluding the maximum and minimum values, among the nine values for each of the existence ratio and the median diameter D50 of dispersed particles of 1 μm or less.

<Synthesis of CNFs>

Example 1

Carbon monoxide as the raw material was purchased from Suzuki Shokan Co., Ltd. G1 grade (high quality, 99.95%) was used.

In a reaction tube made of quartz a catalyst holder was disposed in which a cobalt-magnesium oxide catalyst obtained in Example 1 of Catalyst Preparation with a carrying rate of 5% was loaded such that a content of the active species was 5 mg, and nitrogen gas was flown sufficiently through the tube to achieve nitrogen substitution. Further, reducing gas containing 80% of nitrogen and 20% of hydrogen was heated under atmospheric pressure (101 kPa) to a reaction temperature shown in Table 1, and the reaction temperature was kept for 30 minutes to perform reduction of the catalyst. Immediately thereafter, raw material gas was passed through the catalyst layer, under full pressure of the raw material gas of 101 kPa, with a composition of the raw material gas and a flow rate of carbon monoxide gas shown in Table 1 to perform reaction for 1 hour. Then the raw material gas was changed to nitrogen gas for immediate cooling. Synthetic activity was calculated from mass of the CNFs obtained, mass of the active species used and the reaction time. Further, catalytic activity was calculated from mass of the CNFs obtained, an amount of the catalyst used and the reaction time. Then, Raman spectrometry measurement was performed and a D/G value was obtained, and further, volume resistivity, specific surface area, and a ratio and a median diameter of the dispersed particles were measured. The results are shown in Table 1. Note that as a result of synthesis, the catalytic activity was less than 3 g of CNF/g of catalyst·h, so that the removing process of carrier was performed, and subsequently, the measurement of volume resistivity, specific surface area, a ratio and a median diameter of the dispersed particles was performed.

TABLE 1

| Example No. | Catalyst Used [Example No. of Catalyst Preparation] | Catalyst Species Active Species | Carrier Species | Specific Surface Area of Carrier [m²/g] | Carrying Ratio [%] | Reaction Temperature [° C.] | Composition of Raw Material Gas [Mole Ratio] | Partial Pressure of Carbon Monoxide Gas [MPa] |
|---|---|---|---|---|---|---|---|---|
| 1 | 1 | Cobalt | Magnesium Oxide | 0.61 | 5 | 700 | $CO/H_2/N_2$ = 85/15/0 | 0.086 |
| 2 | 2 | Cobalt | Magnesium Oxide | 0.61 | 20 | 700 | $CO/H_2/N_2$ = 85/15/0 | 0.086 |
| 3 | 3 | Cobalt | Magnesium Oxide | 0.61 | 50 | 700 | $CO/H_2/N_2$ = 85/15/0 | 0.086 |
| 4 | 4 | Cobalt | Magnesium Oxide | 0.61 | 80 | 700 | $CO/H_2/N_2$ = 85/15/0 | 0.086 |
| 5 | 10 | Cobalt | Magnesium Oxide | 2.03 | 20 | 700 | $CO/H_2/N_2$ = 85/15/0 | 0.086 |
| 6 | 9 | Cobalt | Magnesium Oxide | 0.39 | 20 | 700 | $CO/H_2/N_2$ = 85/15/0 | 0.086 |
| 7 | 8 | Cobalt | Magnesium Oxide | 0.11 | 20 | 700 | $CO/H_2/N_2$ = 85/15/0 | 0.086 |
| 8 | 7 | Cobalt | Magnesium Oxide | 0.05 | 20 | 700 | $CO/H_2/N_2$ = 85/15/0 | 0.086 |
| 9 | 3 | Cobalt | Magnesium Oxide | 0.61 | 50 | 700 | $CO/H_2/N_2$ = 85/15/0 | 0.086 |
| 10 | 3 | Cobalt | Magnesium Oxide | 0.61 | 50 | 700 | $CO/H_2/N_2$ = 85/15/0 | 0.086 |
| 11 | 3 | Cobalt | Magnesium Oxide | 0.61 | 50 | 700 | $CO/H_2/N_2$ = 85/15/0 | 0.086 |
| 12 | 3 | Cobalt | Magnesium Oxide | 0.61 | 50 | 700 | $CO/H_2/N_2$ = 85/15/0 | 0.086 |
| 13 | 3 | Cobalt | Magnesium Oxide | 0.61 | 50 | 700 | $CO/H_2/N_2$ = 50/50/0 | 0.051 |
| 14 | 3 | Cobalt | Magnesium Oxide | 0.61 | 50 | 700 | $CO/H_2/N_2$ = 70/30/0 | 0.071 |
| 15 | 3 | Cobalt | Magnesium Oxide | 0.61 | 50 | 700 | $CO/H_2/N_2$ = 90/10/0 | 0.091 |
| 16 | 3 | Cobalt | Magnesium Oxide | 0.61 | 50 | 750 | $CO/H_2/N_2$ = 85/15/0 | 0.086 |
| 17 | 5 | Cobalt | Magnesium Oxide | 0.61 | 100 | 700 | $CO/H_2/N_2$ = 85/15/0 | 0.086 |
| 18 | 6 | Cobalt | Magnesium Oxide | 0.61 | 150 | 700 | $CO/H_2/N_2$ = 85/15/0 | 0.086 |
| 19 | 3 | Cobalt | Magnesium Oxide | 0.61 | 50 | 700 | $CO/H_2/N_2$ = 100/0/0 | 0.101 |

| Example No. | Flow Rate of Carbon Monoxide Gas [note 1] | Synthetic Activity [note 2] | Catalytic Activity [note 3] | Volume Resistivity [Ω·cm] | Specific Surface Area [m²/g] | D/G Area Ratio | Dispersed Particles of 1 μm or less [Volume %] | D50 [μm] |
|---|---|---|---|---|---|---|---|---|
| 1 | 53 | 40 | 2 | 0.028 | 146 | 1.2 | 76 | 0.3 |
| 2 | 53 | 25 | 4 | 0.027 | 122 | 0.9 | 100 | 0.2 |
| 3 | 53 | 30 | 9 | 0.017 | 123 | 0.9 | 86 | 0.4 |
| 4 | 53 | 20 | 8 | 0.025 | 115 | 0.8 | 76 | 0.3 |
| 5 | 53 | 38 | 6 | 0.020 | 167 | 1.1 | 70 | 0.3 |
| 6 | 53 | 25 | 4 | 0.029 | 174 | 1.2 | 81 | 0.3 |
| 7 | 53 | 18 | 3 | 0.030 | 93 | 0.8 | 85 | 0.2 |
| 8 | 53 | 23 | 4 | 0.030 | 147 | 1.2 | 81 | 0.2 |
| 9 | 26 | 35 | 11 | 0.024 | 122 | 1.0 | 83 | 0.2 |
| 10 | 14 | 25 | 8 | 0.024 | 110 | 0.9 | 86 | 0.4 |
| 11 | 7 | 20 | 6 | 0.016 | 90 | 0.7 | 91 | 0.2 |
| 12 | 3 | 11 | 3 | 0.026 | 75 | 0.8 | 100 | 0.1 |
| 13 | 31 | 25 | 8 | 0.030 | 118 | 0.8 | 91 | 0.2 |
| 14 | 43 | 22 | 7 | 0.024 | 114 | 0.9 | 91 | 0.2 |
| 15 | 56 | 24 | 7 | 0.019 | 111 | 0.9 | 100 | 0.1 |
| 16 | 53 | 12 | 4 | 0.029 | 83 | 0.7 | 75 | 0.3 |

TABLE 1-continued

| | | | | | | | | |
|---|---|---|---|---|---|---|---|---|
| 17 | 53 | 24 | 11 | 0.022 | 116 | 0.85 | 48 | 2.1 |
| 18 | 53 | 32 | 16 | 0.020 | 129 | 0.91 | 62 | 1.0 |
| 19 | 62 | 13 | 4 | 0.027 | 111 | 0.77 | 62 | 0.9 |

[note 1]: Unit is [NL/g of active species · min]
[note 2]: Unit is [g of CNF/g of active species · h]
[note 3]: Unit is [g of CNF/g of catalyst · h]

Example 2

By a procedure similar to Example 1 except that a catalyst prepared in Example 2 of Catalyst Preparation with a carrying rate of 20 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 3

By a procedure similar to Example 1 except that a catalyst prepared in Example 3 of Catalyst Preparation with a carrying rate of 50 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 4

By a procedure similar to Example 1 except that a catalyst prepared in Example 4 of Catalyst Preparation with a carrying rate of 80 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 5

By a procedure similar to Example 1 except that a catalyst prepared in Example 10 of Catalyst Preparation with a carrying rate of 20 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 6

By a procedure similar to Example 1 except that a catalyst prepared in Example 9 of Catalyst Preparation with a carrying rate of 20 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 7

By a procedure similar to Example 1 except that a catalyst prepared in Example 8 of Catalyst Preparation with a carrying rate of 20 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 8

By a procedure similar to Example 1 except that a catalyst prepared in Example 7 of Catalyst Preparation with a carrying rate of 20 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 9

By a procedure similar to Example 1 except that a catalyst prepared in Example 3 of Catalyst Preparation with a carrying rate of 50 mass % was loaded such that a content of the active species was 10 mg and that a flow rate of carbon monoxide gas was set at 26 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 10

By a procedure similar to Example 1 except that a catalyst prepared in Example 3 of Catalyst Preparation with a carrying rate of 50 mass % was loaded such that a content of the active species was 20 mg, that reducing gas with a composition of 67% of nitrogen and 33% of hydrogen was used and that a flow rate of carbon monoxide gas was set at 14 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 11

By a procedure similar to Example 1 except that a catalyst prepared in Example 3 of Catalyst Preparation with a carrying rate of 50 mass % was loaded such that a content of the active species was 20 mg, that reducing gas with a composition of 67% of nitrogen and 33% of hydrogen was used and that a flow rate of carbon monoxide gas was set at 7 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 12

By a procedure similar to Example 1 except that a catalyst prepared in Example 3 of Catalyst Preparation with a carrying rate of 50 mass % was loaded such that a content of the active species was 40 mg, that reducing gas with a composition of 67% of nitrogen and 33% of hydrogen was used and that a flow rate of carbon monoxide gas was set at 3 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 13

By a procedure similar to Example 1 except that a catalyst prepared in Example 3 of Catalyst Preparation with a carrying rate of 50 mass % was loaded such that a content of the active species was 3.2 mg, that reducing gas with a composition of $CO/H_2/N_2=50/50/0$ was used and that a flow rate of carbon monoxide gas was set at 31 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 14

By a procedure similar to Example 1 except that a catalyst prepared in Example 3 of Catalyst Preparation with a carrying rate of 50 mass % was loaded such that a content of the active species was 5 mg, that reducing gas with a composition of $CO/H_2/N_2=70/30/0$ was used and that a flow rate of carbon monoxide gas was set at 43 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 15

By a procedure similar to Example 1 except that a catalyst prepared in Example 3 of Catalyst Preparation with a carrying rate of 50 mass % was loaded such that a content of the active species was 5 mg, that reducing gas with a composition of $CO/H_2/N_2=90/10/0$ was used and that a flow rate of carbon monoxide gas was set at 56 NL/g of active species·min, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 16

By a procedure similar to Example 1 except that a catalyst prepared in Example 3 of Catalyst Preparation with a carrying rate of 50 mass % was loaded such that a content of the active species was 5 mg, and that reaction temperature was set at 750° C., CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 17

By a procedure similar to Example 1 except that a catalyst prepared in Example 5 of Catalyst Preparation with a carrying rate of 100 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 18

By a procedure similar to Example 1 except that a catalyst prepared in Example 6 of Catalyst Preparation with a carrying rate of 150 mass % was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Example 19

By a procedure similar to Example 1 except that raw material gas with a gas composition of $CO/H_2/N_2=100/0/0$ was used, that a catalyst of Example 3 of Catalyst Preparation was used and that a flow rate of carbon monoxide gas was set at 62 NL/g of active species·min, CNFs were synthesized, synthetic activity and catalytic activity were calculated similarly to Example 1, and a D/G value, specific surface area, a ratio and a median diameter of the dispersed particles were measured. The results are shown in Table 1. Note that as a result of synthesis, the catalytic activity was 3 g of CNF/g of catalyst·h or more, so that the removing process of carrier was not performed.

Comparative Example 1

By a procedure similar to Example 1 except that a catalyst of Example 11 of Catalyst Preparation, which fell out of the range of specific surface area of the manufacturing method of the present embodiment, was loaded such that a content of the active species was 5 mg, CNFs were synthesized, synthetic activity and catalytic activity were calculated similarly to Example 1, and a D/G value, volume resistivity, specific surface area, a ratio and a median diameter of the dispersed particles were measured. The results are shown in Table 2. Note that as a result of synthesis, the catalytic activity was 3 g of CNF/g of catalyst·h or more, so that the removing process of carrier was not performed.

Comparative Example 2

By a procedure similar to Example 1 except that a catalyst of Example 12 of Catalyst Preparation, which has zinc oxide as the carrier, was loaded such that a content of the active species was 5 mg, CNFs were synthesized. Synthetic activity was too low to reach a predetermined value, therefore volume resistivity and the like were not measured.

Comparative Example 3

By a procedure similar to Example 1 except that a catalyst of Example 13 of Catalyst Preparation, which has alumina as the carrier, was loaded such that a content of the active species was 5 mg, CNFs were synthesized. Synthetic activity was too low to reach a predetermined value, therefore volume resistivity and the like were not measured.

TABLE 2

| Comparative Example No. | Catalyst Used [Example No. of Catalyst Preparation] | Catalyst Species | | Specific Surface Area of Carrier [$m^2/g$] | Carrying Ratio [%] | Reaction Temperature [° C.] | Composition of Raw Material Gas [Mole Ratio] | Partial Pressure of Carbon Monoxide Gas [MPa] |
|---|---|---|---|---|---|---|---|---|
| | | Active Species | Carrier Species | | | | | |
| 1 | 11 | Cobalt | Magnesium Oxide | 9.38 | 50 | 700 | $CO/H_2/N_2 =$ 85/15/0 | 0.086 |
| 2 | 12 | Cobalt | Zinc Oxide | 0.24 | 50 | 700 | $CO/H_2/N_2 =$ 85/15/0 | 0.086 |
| 3 | 13 | Cobalt | Alumina | 0.18 | 50 | 700 | $CO/H_2/N_2 =$ 85/15/0 | 0.086 |
| 4 | 14 | Iron | Magnesium Oxide | 0.61 | 50 | 700 | $CO/H_2/N_2 =$ 85/15/0 | 0.086 |
| 5 | 3 | Cobalt | Magnesium Oxide | 0.61 | 50 | 650 | $CO/H_2/N_2 =$ 85/15/0 | 0.086 |
| 6 | 3 | Cobalt | Magnesium Oxide | 0.61 | 50 | 800 | $CO/H_2/N_2 =$ 85/15/0 | 0.086 |
| 7 | 15 | Cobalt-Magnesium Oxide Coprecipitated Catalyst | | | | 700 | $CO/H_2/N_2 =$ 85/15/0 | 0.086 |
| 8 | 16 | Cobalt-Magnesium Oxide Mixture Catalyst | | | | 700 | $CO/H_2/N_2 =$ 85/15/0 | 0.086 |
| 9 | — | — | — | — | — | — | — | — |

| Comparative Example No. | Flow Rate of Carbon Monoxide Gas [note 1] | Synthetic Activity [note 2] | Catalytic Activity [note 3] | Volume Resistivity [Ω · cm] | Specific Surface Area [$m^2/g$] | D/G Area Ratio | Dispersed Particles of 1 μm or less [Volume %] | D50 [μm] |
|---|---|---|---|---|---|---|---|---|
| 1 | 53 | 39 | 12 | 0.026 | 179 | 0.88 | 12 | 8.0 |
| 2 | 53 | 0 | 0 | — | — | — | — | — |
| 3 | 53 | 3 | 1 | — | — | 0.66 | — | — |
| 4 | 53 | 5 | 2 | — | — | 1.43 | — | — |
| 5 | 53 | 50 | 15 | 0.036 | 166 | 1.38 | 3 | 20.0 |
| 6 | 53 | 4 | 1 | — | — | 0.61 | — | — |
| 7 | 103 | 22 | 11 | 0.040 | 288 | 1.23 | 14 | 7.7 |
| 8 | 53 | 1 | 0 | — | — | — | — | — |
| 9 | — | — | — | 0.023 | 241 | 1.73 | 9 | 21.1 |

[note 1]: Unit is [NL/g of active species · min]-
[note 2]: Unit is [g of CNF/g of active species · h]
[note 3]: Unit is [g of CNF/g of catalyst · h]
[note 4]: "—" means not measured

Comparative Example 4

By a procedure similar to Example 1 except that a catalyst of Example 14 of Catalyst Preparation, whose active species was iron, was loaded such that a content of the active species was 5 mg, CNFs were synthesized. Synthetic activity was too low to reach a predetermined value, therefore volume resistivity and the like were not measured.

Comparative Example 5

By a procedure similar to Example 1 except that synthesis was performed at 650° C., which fell out of the reaction temperature range of the manufacturing method of the present embodiment, and that a catalyst of Example 3 of Catalyst Preparation was used, CNFs were synthesized, synthetic activity and catalytic activity were calculated similarly to Example 1, and a D/G value, volume resistivity, specific surface area, a ratio and a median diameter of the dispersed particles were measured. The results are shown in Table 2. Note that as a result of synthesis, the catalytic activity was 3 g of CNF/g of catalyst·h or more, so that the removing process of carrier was not performed.

Comparative Example 6

By a procedure similar to Example 1 except that synthesis was performed at 800° C., which fell out of the reaction temperature range of the manufacturing method of the present embodiment, and that a catalyst of Example 3 of Catalyst Preparation was used, CNFs were synthesized. Synthetic activity was too low to reach a predetermined value, therefore volume resistivity and the like were not measured. The results are shown in Table 2.

Comparative Example 7

By a procedure similar to Example 1 except that in a reaction tube made of quartz a catalyst holder was disposed in which 5 mg of a catalyst obtained in Example 15 of Catalyst Preparation was loaded and that a flow rate of carbon monoxide gas was set at 103 NL/g of active species·min, CNFs were synthesized, and various kinds of estimation were performed. The results are shown in Table 2. Note that as a result of synthesis, the catalytic activity was 3 g of CNF/g of catalyst·h or more, so that the removing process of carrier was not performed.

Comparative Example 8

By a procedure similar to Example 1 except that a catalyst of Example 16 of Catalyst Preparation, which was not a cobalt-magnesium carried catalyst of Examples, was used, CNFs were synthesized. Synthetic activity was too low to reach a predetermined value, therefore volume resistivity and the like were not measured. The results are shown in Table 2.

Comparative Example 9

Volume resistivity, a D/G value, specific surface area and particle size distribution of commercially available CNFs (Flotube9000, product of Cnano Technology Limited) were measured. The results are shown in Table 2.

<Discussion on Results>

CNFs obtained in each of Examples were confirmed to be multi-walled carbon nanotubes through TEM observation (a TEM photograph of a CNF of Example 10 as a representative is shown in FIG. 1). CNFs of Examples 1 to 19 had high crystallinity, electric conductivity and dispersibility.

Further, CNFs having high crystallinity, electric conductivity and dispersibility could be manufactured at high activity, as shown in Examples 1 to 19. Especially, high activity cannot be achieved with catalysts of different constitutions (Comparative Examples 2 to 4, 6 and 8). Further, activity was decreased also in the case of a temperature higher than the reaction temperature condition (Comparative Example 6).

In cases where synthesis was performed at the reaction temperatures shown in Examples 1 to 19, CNFs having a lower D/G value, i.e., higher crystallinity than Comparative Example 9 could be synthesized.

When synthesis was performed with the catalysts and under the conditions shown in Examples 1 to 19, CNFs having higher dispersibility than Comparative Examples 1, 5, 7 and 9 could be synthesized.

In Examples 1 to 16, CNFs having still higher dispersibility than Examples 17 to 19 could be synthesized.

What is claimed is:

1. A manufacturing method of carbon nanofibers, wherein an active species including cobalt as a chief component is employed as a catalyst and carbon monoxide is used as a carbon source, and manufacturing is performed under the conditions that
    said catalyst has 3 to 150 mass % of said active species carried on a carrier composed of a magnesium-containing oxide having a specific surface area of 0.01 to 5 m2/g,
    a reaction temperature is between 670 and 780° C.,
    partial pressure of carbon monoxide is between 0.04 and 0.98 MPa, and
    a flow rate of carbon monoxide gas is 2 NL/g of active species·min or more.

2. A manufacturing method of carbon nanofibers of claim 1, wherein a carrying rate of said catalyst is between 3 and 90 mass %, and partial pressure of hydrogen is between 1 to 100% relative to the partial pressure of carbon monoxide.

3. Carbon nanofibers produced by a manufacturing method of carbon nanofibers of claim 1, wherein
    volume resistivity measured under a load of 9.8 MPa is 0.030 Ω·cm or less and D/G is between 0.5 and 1.3, and dispersed particles of 1 μm or less in toluene is 40 volume % or more or a median diameter D50 is 5 μm or less.

4. Carbon nanofibers produced by a manufacturing method of carbon nanofibers of claim 2, wherein
    volume resistivity measured under a load of 9.8 MPa is 0.030 Ω·cm or less and D/G is between 0.5 and 1.3, and dispersed particles of 1 μm or less in toluene is 70 volume % or more or a median diameter D50 is 0.7 μm or less.

5. Carbon nanofibers wherein volume resistivity measured under a load of 9.8 MPa is 0.030 Ω·cm or less and D/G is between 0.5 and 1.3, and dispersed particles of 1 μm or less in toluene is 40 volume % or more or a median diameter D50 is 5 μm or less.

6. Carbon nanofibers of claim 5, wherein said dispersed particles of 1 μm or less in toluene is 70 volume % or more or said median diameter D50 is 0.7 μm or less.

* * * * *